(12) United States Patent
Lee et al.

(10) Patent No.: US 10,654,467 B2
(45) Date of Patent: May 19, 2020

(54) HYBRID VEHICLE AND METHOD OF PERFORMING TEMPERATURE CONTROL THEREFOR

(71) Applicants: Hyundai Motor Company, Seoul (KR); Kia Motors Corporation, Seoul (KR)

(72) Inventors: Jea Mun Lee, Seoul (KR); Joon Young Park, Seoul (KR); Ji Hoon Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 251 days.

(21) Appl. No.: 15/852,694

(22) Filed: Dec. 22, 2017

(65) Prior Publication Data

US 2019/0001960 A1   Jan. 3, 2019

(30) Foreign Application Priority Data

Jun. 30, 2017   (KR) .................. 10-2017-0083580

(51) Int. Cl.
*B60W 20/15* (2016.01)
*B60W 20/20* (2016.01)
*B60W 50/00* (2006.01)

(52) U.S. Cl.
CPC ............ *B60W 20/15* (2016.01); *B60W 20/20* (2013.01); *B60W 50/0097* (2013.01); *B60W 2050/0014* (2013.01); *B60W 2510/30* (2013.01); *B60W 2520/105* (2013.01); *B60W 2540/10* (2013.01); *B60W 2540/12* (2013.01); *B60W 2540/30* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,886,648 B1 * | 5/2005 | Hata .................. | B60K 6/387 180/65.235 |
| 2012/0136553 A1 * | 5/2012 | Takeuchi ............ | F02N 11/0814 701/102 |
| 2016/0107527 A1 * | 4/2016 | Amano ................ | B60L 50/10 701/22 |

* cited by examiner

*Primary Examiner* — Lail A Kleinman
(74) *Attorney, Agent, or Firm* — Mintz Levin Cohn Ferris Glovsky and Popeo, P.C.; Peter F. Corless (57) ABSTRACT

A method of performing temperature control of a hybrid vehicle implements a mode change control method capable of efficiently performing heating in cold weather by predicting a stop of the hybrid vehicle. The method includes receiving an engine operation request from a full automatic temperature control (FATC) unit, determining whether to enter a first hybrid electric vehicle (HEV) mode utilizing engine power as driving force, determining whether a predicted stop time is equal to or less than a predetermined time, when entry into the first HEV mode is impossible, and disallowing entry into a second HEV mode utilizing engine power for generation of electricity, when the predicted stop time is equal to or less than the predetermined time.

20 Claims, 8 Drawing Sheets

HYBRID VEHICLE AND METHOD OF PERFORMING TEMPERATURE CONTROL THEREFOR

CROSS-REFERENCE TO RELATED APPLICATION

This application claims under 35 U.S.C. § 119(a) the benefit of Korean Patent Application No. 10-2017-0083580, filed on Jun. 30, 2017, the entire contents of which are incorporated by reference herein.

BACKGROUND

(a) Technical Field

The present disclosure relates to a hybrid vehicle and a method of performing temperature control therefor, and more particularly, to a mode change control method capable of efficiently performing heating in cold weather by predicting a stop of the hybrid vehicle, and the hybrid vehicle for performing the same.

(b) Description of the Related Art

Recently, with continued demand for improvement of fuel efficiency of vehicles and stringent regulations on emissions from vehicles in many countries, demand for eco-friendly vehicles has increased. As an example of such eco-friendly vehicles, hybrid electric vehicles (HEVs) and plug-in hybrid electric vehicles (PHEVs) have been developed.

A hybrid vehicle runs using two power sources including an engine and a motor. In the case of harmonious operation of the engine and the motor, optimal output and torque may be generated. Specifically, in the case of a hybrid vehicle equipped with a parallel-type or TMED-type (Transmission-Mounted-Electric-Device-type) hybrid system, in which an electric motor and an engine clutch (EC) are installed between an engine and a transmission, the output of the engine and the output of the motor may be transmitted to a drive shaft simultaneously.

Typically, in the initial stage of acceleration, a hybrid vehicle runs using electric energy (i.e., an EV mode). However, there is a limitation in providing the power required by a driver using only electric energy, and there is thus a need to use an engine as a main power source (i.e., an HEV mode) at certain moments. At such times, when the difference between the number of revolutions per minute of the motor and the number of revolutions per minute of the engine is within a predetermined range, the hybrid vehicle operates such that an engine clutch is engaged so that the motor and the engine rotate together.

Of course, the engine may not be used as the main power source even in the HEV mode. For example, in a parallel mode of the HEV mode, the power of the engine functions as a driving force. However, in a series HEV mode, the engine is driven with low load and thus the power of the engine is used to generate electricity. Driving points and efficiency of the parallel HEV mode and the series HEV mode will be described with reference to FIG. 1.

Figure 1:
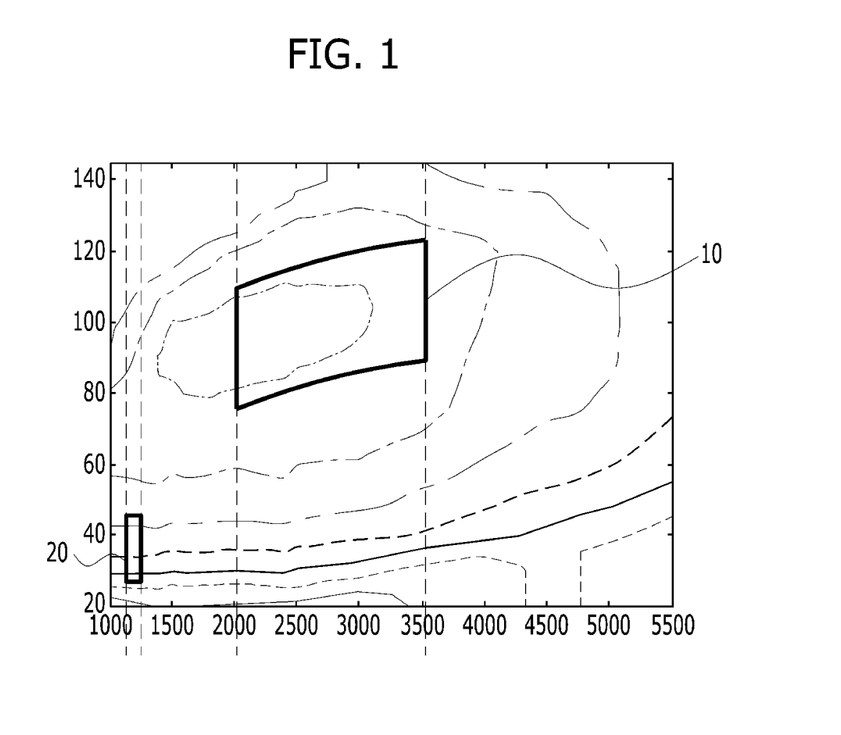
FIG. 1 (RELATED ART) is a view illustrating a relationship between a driving point and efficiency according to the HEV mode of a general hybrid vehicle.

FIG. 1 (RELATED ART) is a view illustrating a relationship between a driving point and efficiency according to the HEV mode of a general hybrid vehicle.

FIG. 1 shows a brake specific fuel consumption graph (BSFC) representing engine efficiency, wherein the horizontal axis indicates an engine RPM and the vertical axis indicates a vehicle speed. Efficiency gradually increases toward the center of a circular ISO efficiency curve.

As shown in FIG. 1, a parallel driving region 10 is set in a relatively high efficiency region. In contrast, a series engine driving region 20 is generally set in a low RPM region 1100 to 1300 in consideration of vibration, noise and output of a motor (e.g., hybrid starter generator (HSG)) which will generate electricity.

Meanwhile, in recently released vehicles, a full automatic temperature control (FATC) unit is responsible for performing temperature control. In hybrid vehicles, as necessary, the FATC performs control to heat indoor air using engine coolant heated by heat of the engine. More specifically, when a positive temperature coefficient (PTC) heater is not mounted in a hybrid vehicle or when a PTC heater having low capacity is mounted, the FATC may determine that engine coolant is utilized. At this time, the FATC requests operation of the engine from a hybrid control unit (HCU), when the temperature of engine coolant is less than that of water necessary for heating.

Then, the HCU operates the engine and selects any one of the parallel mode and the series mode according to situations. However, as described above with reference to FIG. 1, since the parallel mode is more excellent than the series mode in terms of engine efficiency, when the parallel mode is possible (when a vehicle runs at a predetermined speed or more), the parallel mode may be preferentially selected.

However, when a short stop occurs in the parallel mode and the driving mode is changed to the series mode based on the driving point of the engine during a stop time, an inefficient control result is obtained. This will be described with reference to FIG. 2.

Figure 2:
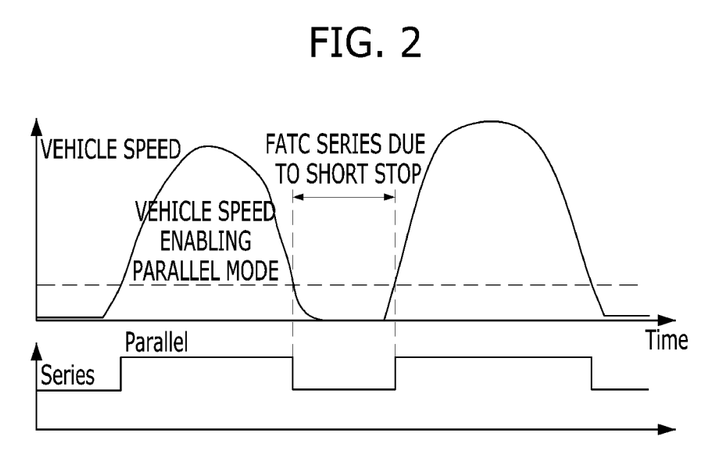
FIG. 2 (RELATED ART) is a view illustrating problems occurring due to HEV mode change control based on a vehicle speed in a general hybrid vehicle.

FIG. 2 (RELATED ART) is a view illustrating problems occurring due to HEV mode change control based on a vehicle speed in a general hybrid vehicle.

FIG. 2 shows an upper graph and a lower graph. The horizontal axes of the two graphs indicate time, the vertical axis of the upper graph indicates vehicle speed, and the vertical axis of the lower graph indicates driving mode of a hybrid powertrain. That is, in the lower graph, a lowest point of the vertical axis indicates an EV mode, a middle point thereof indicates an HEV mode and a highest point thereof indicates a parallel HEV mode.

Referring to FIG. 2, as the vehicle speed reaches a value capable of entering the parallel mode after the vehicle departs in a state of stopping in the series mode, the driving mode of the vehicle may be changed to the parallel mode. Even when the vehicle stops for a relatively short period of time due to traffic signals while being driven in the parallel mode, if the vehicle speed capable of entering the parallel mode is not satisfied due to stoppage, the driving mode of the vehicle is temporarily changed to the series mode. As a result, due to change to the series mode, the engine operates at a low-efficiency driving point during the stop time and coolant temperature increase is insignificant due to low engine output.

SUMMARY

Accordingly, the present disclosure is directed to a hybrid vehicle and a method of performing temperature control therefor.

An object of the present disclosure is to provide a method of efficiently performing heating in a hybrid vehicle in cold weather and a vehicle for performing the same.

Another object of the present disclosure is to provide a mode change control method, which is capable of solving non-increase in temperature of coolant and deterioration of engine efficiency due to a short stop, and a vehicle for performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a mode change of a hybrid vehicle includes: receiving, by a hybrid control unit, an engine operation request from a full automatic temperature control (FATC) unit; determining, by the hybrid control unit, whether to enter a first hybrid electric vehicle (HEV) mode utilizing engine power as driving force; determining, by the hybrid control unit, whether a predicted stop time is equal to or less than a predetermined time, when entry into the first HEV mode is impossible; and disallowing entry, by the hybrid control unit, into a second HEV mode utilizing engine power for generation of electricity, when the predicted stop time is equal to or less than the predetermined time.

In another aspect of the present disclosure, a hybrid vehicle includes a full automatic temperature control (FATC) unit for controlling a temperature control function, and a hybrid control unit for performing control to receive an engine operation request from the FATC, to determine whether to enter a first hybrid electric vehicle (HEV) mode utilizing engine power as driving force, to determine whether a predicted stop time is equal to or less than a predetermined time, when entry into the first HEV mode is impossible, and to disallow entry into a second HEV mode utilizing engine power for generation of electricity, when the predicted stop time is equal to or less than the predetermined time.

In a further aspect of the present disclosure, a non-transitory computer readable medium containing program instructions executed by a processor includes: program instructions that receive an engine operation request from a full automatic temperature control (FATC) unit; program instructions that determine whether to enter a first hybrid electric vehicle (HEV) mode utilizing engine power as driving force; program instructions that determine whether a predicted stop time is equal to or less than a predetermined time, when entry into the first HEV mode is impossible; and program instructions that disallow entry into a second HEV mode utilizing engine power for generation of electricity, when the predicted stop time is equal to or less than the predetermined time.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, illustration of elements having no connection with the description is omitted, and the same or extremely similar elements are designated by the same reference numerals throughout the specification.

In the entire specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

In the embodiment of the present disclosure, when a hybrid vehicle enters a hybrid electric vehicle (HEV) mode according to an engine operation request from a full automatic temperature control (FATC), whether a short stop or a long stop will occur is predicted, a series mode is allowed in a long stop and a parallel mode is allowed in a short stop. In particular, the short stop means that a time when a stop is predicted to be maintained from a current time (that is, predicted stop time) is equal to or less than a threshold time. As provided herein, the threshold time may be predetermined or changed.

To this end, it is necessary to determine whether a stop occurs, a predicted stop time, that is, whether a vehicle will depart in the near future. First, the structure of a vehicle capable of predicting whether a stop occurs and whether the vehicle will depart in the near future will be described with reference to FIG. 5.

Figure 3:
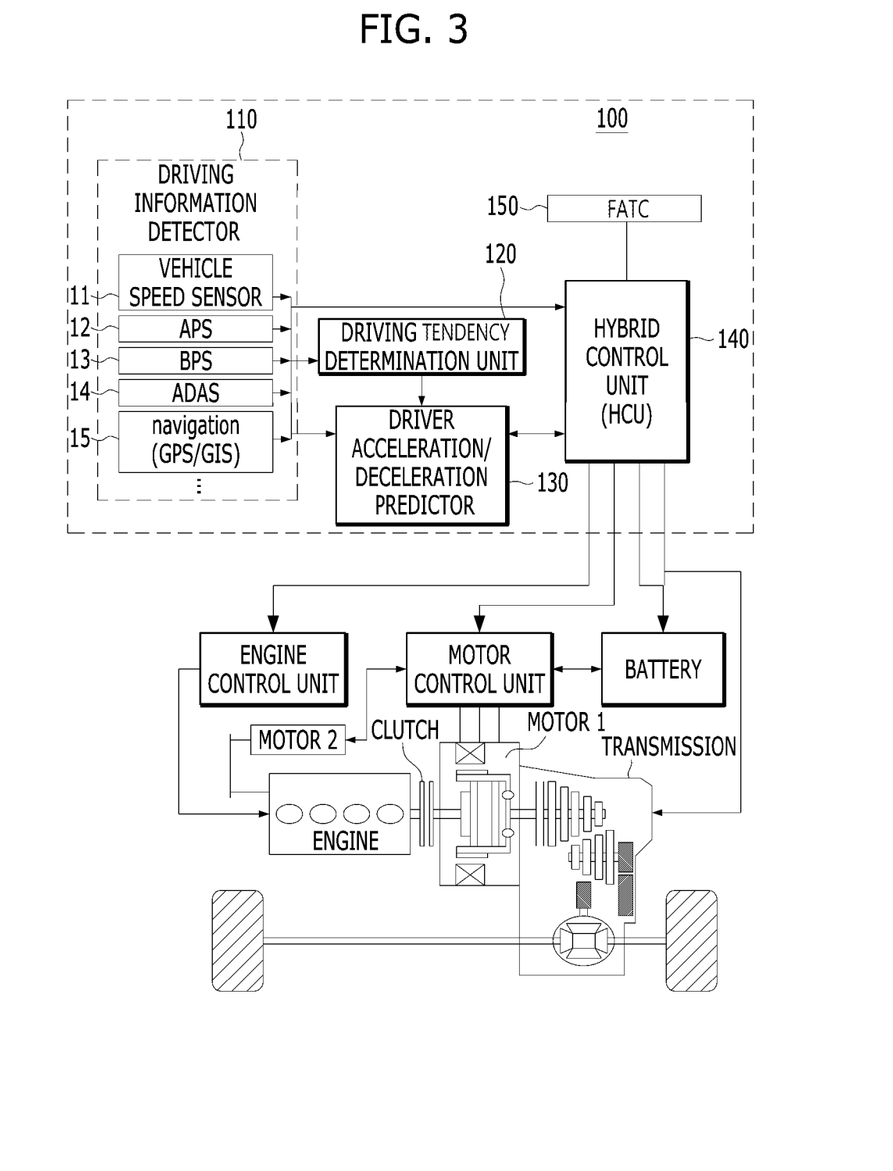
FIG. 3 is a block diagram schematically illustrating a control system of a hybrid vehicle according to an embodiment of the present disclosure.

FIG. 3 is a block diagram schematically illustrating a control system of a hybrid vehicle according to an embodiment of the present disclosure.

Referring to FIG. 3, a control system 100 of the hybrid vehicle according to the embodiment of the present disclosure includes a driving information detector 110, a driving tendency determination unit 120, a driver acceleration/deceleration predictor 130, a hybrid control unit 140, and a FATC 150. This construction is merely illustrative, and a greater or smaller number of components may constitute the control system (e.g., the driving tendency determination unit may be omitted).

The driving information detector 110 detects driving information related to traveling of the vehicle, in association with at least one of a vehicle speed sensor 11, an accelerator pedal position sensor (APS) 12, a brake pedal sensor (BPS) 13, an advanced driver assistance system (ADAS) 14, and/or a navigation device 15.

The driving information detector 110 detects the driver's accelerator operation state through the APS 12, and detects the brake operation state through the BPS 13.

The driving information detector 110 detects the vehicle speed through the vehicle speed sensor 11, and detects information about movement ahead of the vehicle, which includes the relative distance to a leading vehicle and the state of acceleration, through radar sensors or (stereo) cameras of the ADAS 14. Besides the radar sensors or cameras, various other sensors, for example, using ultrasonic waves or lasers, may be employed in accordance with the configuration of the ADAS.

The driving information detector 110 detects navigation information (road environment information) such as, for example, a vehicle location based on GPS/GIS, a type of road, a traffic congestion degree, a speed limit, an intersection, a tollgate, a turn, and a slope, through the navigation device 15. In particular, the navigation device 15 may refer to the navigation map stored therein and traffic information collected through external wireless communication (e.g. telematics or TPEG) in order to provide the above information.

The driving tendency determination unit 120 determines a driver's driving tendency based on driving patterns such as, for example, average vehicle speed, variation in the accelerator pedal position sensor (APS) dAPS, and variation in the brake pedal sensor (BPS) dBPS, which are caused by a driver's driving operation.

For example, the driving tendency determination unit 120 includes a fuzzy membership function using the factors detected by the driving information detector 110, which include the variation in the APS, the variation in the BPS, the vehicle speed and the degree of slope, as input parameters, and calculates a short-term driving tendency index (SI=0 to 100%).

The driving tendency determination unit 120 may divide the calculated short-term driving tendency index (SI=0 to 100%) by a predetermined reference percentage in accordance with the degree of driving tendency, thereby enabling the driver's driving tendency to be determined to be one of a plurality of levels.

The driver acceleration/deceleration predictor 130 learns an acceleration/deceleration prediction model depending on the driving tendency utilizing a machine-learning method, and generates a predictive value of driver's intention to accelerate/decelerate in the near future, which reflects the traveling conditions of the vehicle and the driving tendency, using the acceleration/deceleration prediction model. That is, the driver acceleration/deceleration predictor 130 uses the vehicle speed, the radar information and the navigation information, which are detected by the driving information detector 110, and the driver's driving tendency as input parameters, and quantitatively digitizes a driving operation form that is shown in a comparatively short time unit, thereby determining the driver's momentary intention to accelerate/decelerate and consequently generating a predictive value of driver's acceleration/deceleration in the near future. This acceleration/deceleration predictive value may include a force and a probability of pressing the accelerator pedal or the brake pedal, broken down into predetermined units of time, in the near future.

The concrete prediction algorithm of the acceleration/deceleration predictor 130 may include a neural network that makes up for the pre-generated prediction model utilizing the machine-learning method, which will be described in detail later.

The hybrid control unit 140 controls the operation of the components for switching the driving mode of the hybrid vehicle according to the embodiment of the present disclosure, and serves as a top-level control unit that integrally controls a clutch control unit, an engine control unit and a motor control unit, which are connected thereto over a network.

In particular, the hybrid control unit 140 may determine a driving mode according to a relationship between a vehicle speed and engine efficiency when an engine operation request is received from the FATC 150 and whether a short stop occurs. At this time, occurrence/non-occurrence of a stop occurs and a stop time may be predicted by acquiring the near-future acceleration/deceleration predictive value from the acceleration/deceleration predictor 130.

The hybrid control unit 140 may analyze a currently required torque of the driver based on variation in the APS or BPS that is detected by the driving information detector 110, and may transmit the currently required torque to another control unit such as a transmission control unit.

Of course, in some embodiments, the acceleration/deceleration predictor 130 may predict a near-future required torque using the near-future acceleration/deceleration predictive value.

In addition, the transmission control unit may determine whether to perform transmission according to the currently required torque.

The above-described embodiment may alternatively be configured such that the driving tendency determination unit 120 is omitted. In this case, the driver acceleration/deceleration predictor 130 may perform acceleration/deceleration prediction without input values related to the driving tendency.

Hereinafter, a method of predicting the driver's intention to accelerate/decelerate using the driver acceleration/deceleration predictor 130 will be described with reference to FIGS. 4A and 4B.

Figure 4A:
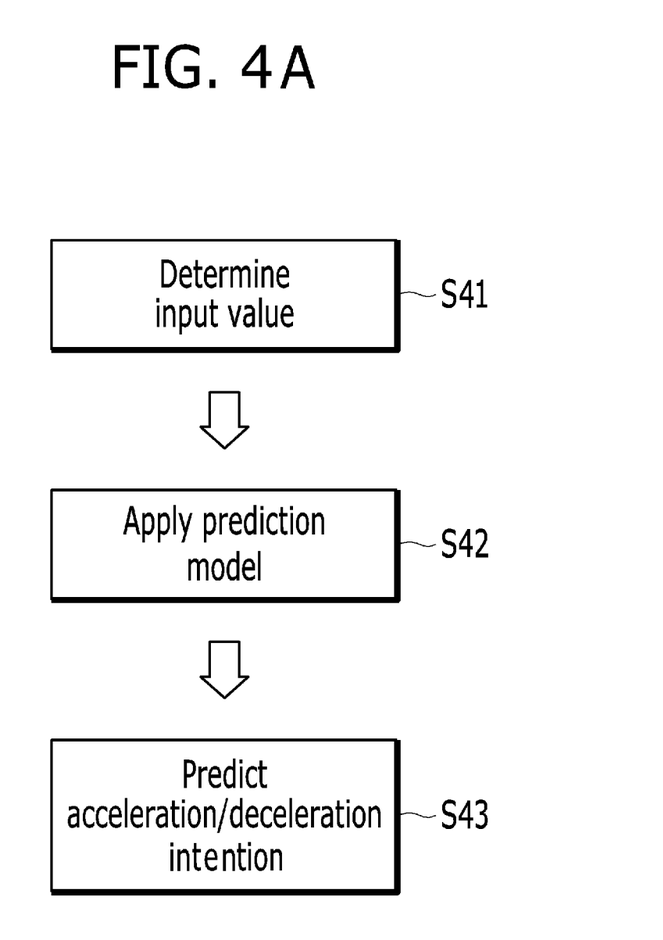
FIGS. 4A and 4B illustrate an exemplary process of predicting a driver's intention to accelerate/decelerate that is applicable to the embodiment of the present disclosure.
Figure 4B:
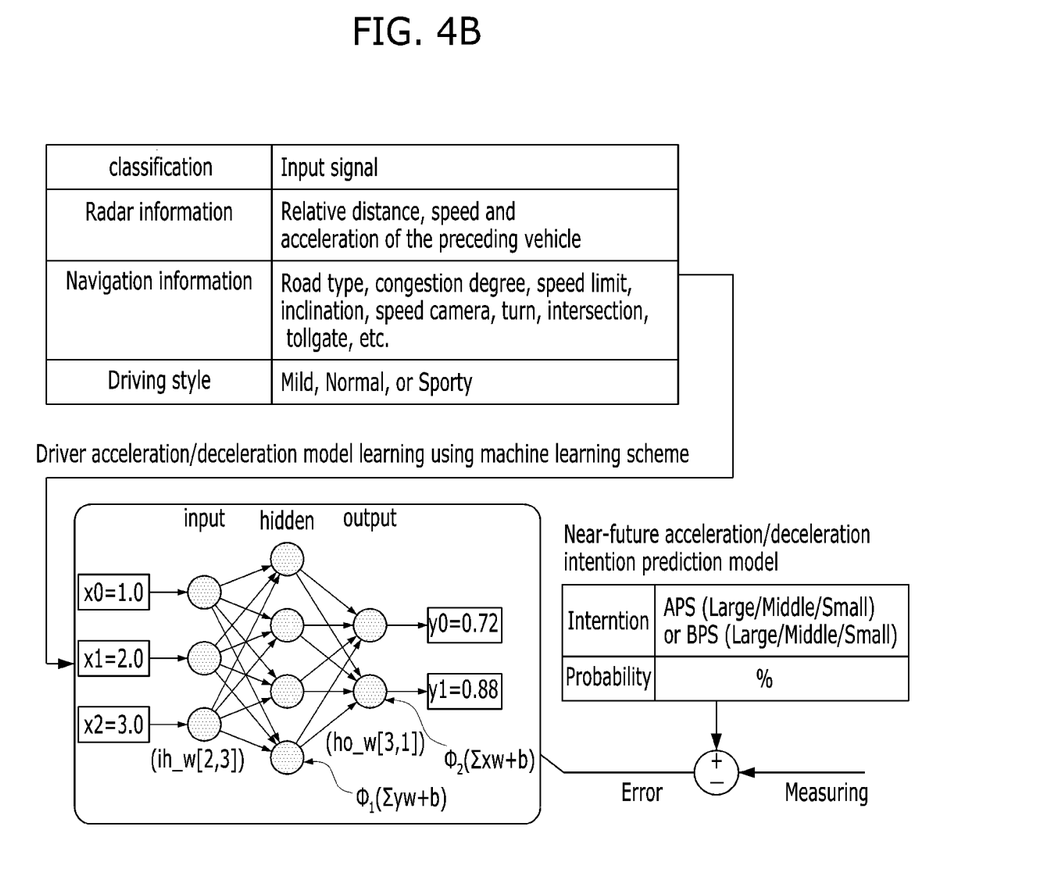

FIGS. 4A and 4B illustrate an exemplary process of predicting the driver's intention to accelerate/decelerate that is applicable to the embodiments of the present disclosure.

Referring to FIG. 4A, the process of predicting the driver's intention to accelerate/decelerate, which is performed by the driver acceleration/deceleration predictor 130, may include the following three steps. First, it may be determined what parameters are used as input values for prediction (S41). A prediction model is modified using the determined input values through machine learning (S42). Acceleration or deceleration is determined through the input values and the modified model, and a predictive value pertaining to the near-future situation is calculated (S43).

Step S41 of determining the input values may include: 1) a step of extracting candidate values of the input values; 2) a step of preprocessing data by integrating the input signals; and 3) a step of selecting final parameters using the preprocessed candidate values. A time-series-model-based method or a deep-learning-based method may be used as the machine-learning method. Examples of the time-series-model-based method include an autoregressive integrated moving average (ARIMA) method, which represents variation in action with time using stochastic indicators, and a multi-layer perceptron (MLP) method, which uses a nonparametric regression method for a universal approximator. Examples of the deep-learning-based method include a stacked autoencoder (SAE) method, which makes input and output data similar to each other through dimension reduction, a recurrent-neural-network (RNN) method, which is a neural network algorithm for processing sequential information, and a long-short-term memory (LSTM) method, which is suitable for long-term dependent learning. An exemplary process of predicting the driver's intention to accelerate/decelerate in the near future, which is performed by the driver acceleration/deceleration predictor using a neural network algorithm, among the above machine-learning methods, is illustrated in FIG. 4B.

Referring to FIG. 4B, the driver acceleration/deceleration predictor 130 according to the embodiment of the present disclosure includes a neural network, which learns an acceleration/deceleration prediction model based on a driver's driving tendencies utilizing the machine-learning method.

A near-future acceleration/deceleration prediction model for driving tendencies is preferably prestored in the driver acceleration/deceleration predictor 130 based on big data accumulated through test driving before the vehicle is released for sale utilizing the neural network.

Further, the driver acceleration/deceleration predictor 130 may add vehicle movement data, learned from an actual driver's driving operation after the vehicle is sold to the driver, to the near-future acceleration/deceleration prediction model for driving tendencies, which has been prestored therein utilizing the neural network, and may therefore generate a near-future acceleration/deceleration prediction model for driving tendencies, which is specialized for the actual driver. In this case, in accordance with the determination of the actual driver's tendencies, the driver acceleration/deceleration predictor 130 may apply the learned movement data to the near-future acceleration/deceleration prediction model that corresponds to the determined driving tendency.

The driver acceleration/deceleration predictor 130 may calculate a near-future acceleration/deceleration intention predictive value depending on the driver's driving tendency on the basis of input information including a driving environment and the driver's driving tendencies, which are determined based on the vehicle speed, radar information and navigation information. In particular, the driving tendency, as shown in FIG. 4B, may be classified into a plurality of types, and may be represented by numerical values of an average vehicle speed, variation in the accelerator pedal dAPS, and variation in the brake pedal dBPS.

Further, the driver acceleration/deceleration predictor 130 may modify the driver acceleration/deceleration model in real time through the machine-learning method in the state of being installed in the vehicle, or may be used only for prediction without learning by receiving a modified model from an external device.

That is, in the case in which the model is modified by an external device, the parameters, which are input values for learning, are transmitted to a telematics center or a cloud server. Therefore, the modification of the model through learning is performed by the external device, and only the final model is then transmitted to the vehicle.

Figure 5:
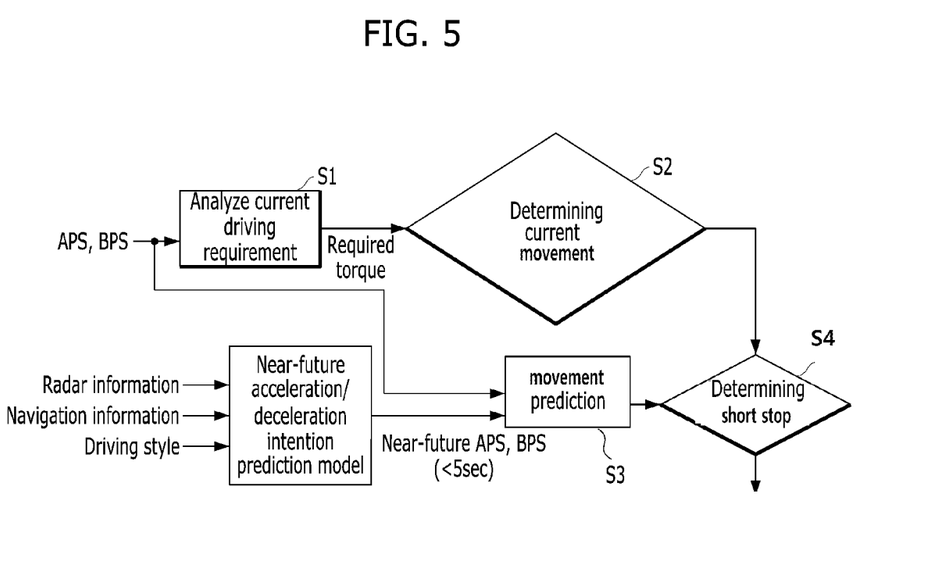
FIG. 5 illustrates an exemplary logic of determining stop properties using a near-future acceleration/deceleration prediction model according to an embodiment of the present disclosure.

FIG. 5 illustrates an example of a logic of determining stop properties using a near-future acceleration/deceleration prediction model according to an embodiment of the present disclosure.

Referring to FIG. 5, the hybrid control unit 140 according to the embodiment of the present disclosure analyzes a current DRIVING REQUIREMENT according to APS or BPS manipulation of the driver, and calculates a required torque (S1). The hybrid control unit 140 determines the current movement of the vehicle, for example, whether the vehicle is currently stopping based on the currently required torque and BPS manipulation (S2).

The driver acceleration/deceleration predictor 130 outputs prediction information about a driver's intention to accelerate/decelerate using the near-future acceleration/deceleration prediction model, and the hybrid control unit 140 may predict the movement of the vehicle by predicting a near-future torque (that is, a required torque predictive value) (S3). As a result, when the current movement of the vehicle and the movement of the vehicle which will occur in the near-future are combined, whether a current stop is a short stop may be determined depending on whether the vehicle stops or not and whether the vehicle will depart in the near future.

For example, when a current vehicle speed is less than a first threshold and a required torque predictive value is greater than a second threshold, since the vehicle is currently stopping but will be accelerated in the near future, a short stop may be determined. As another example, when the vehicle stops at an intersection, traffic signal information may be acquired from the driving information detector 110 to predict a stop time depending on whether a signal is changed or not in the near future. As another example, when the distance of a congested section is short on an expressway, that is, when a time required to escape from the congested section is less than a third threshold or when the residual distance of the congested section is less than a fourth threshold, a short stop may be predicted.

The required torque predictive value may be calculated by the driver acceleration/deceleration predictor 130, or as described above, may be calculated by the hybrid control unit 140. Although not illustrated in the drawings, the required torque predictive value may be calculated by a separate control unit for generating the required torque predictive value.

Meanwhile, a method of changing the driving mode of the hybrid vehicle according to the embodiment of the present disclosure, which is performed by the above-described control system 100 of the hybrid vehicle as a main agent, will be described in more detail with reference to FIG. 6.

Figure 6:
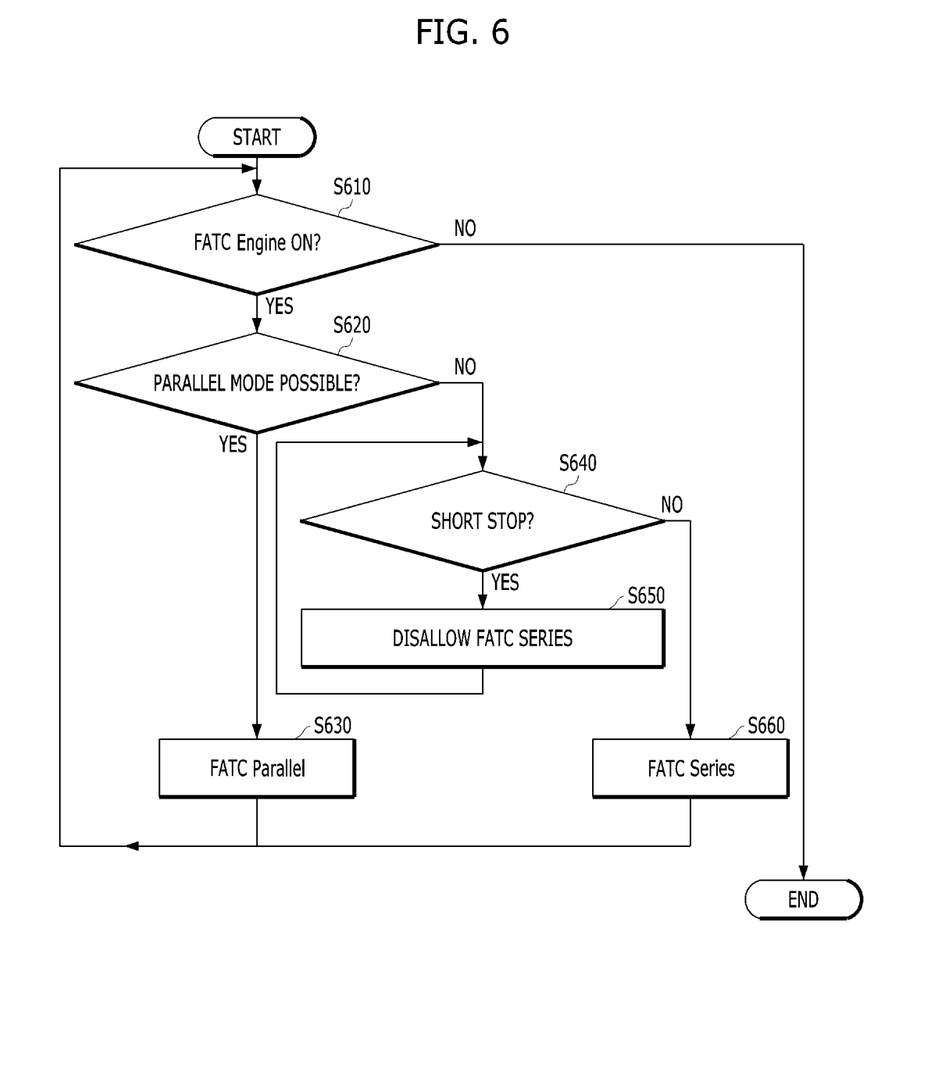
FIG. 6 is a flowchart showing an exemplary method of controlling a mode change in the hybrid vehicle according to an embodiment of the present disclosure.

FIG. 6 is a flowchart showing an exemplary method of controlling a mode change in the hybrid vehicle according to an embodiment of the present disclosure.

Referring to FIG. 6, when an engine operation request is received from the FATC (S610), the hybrid control unit may determine whether to enter the parallel mode according to a current driving situation and a predetermined criterion (S620). When entry into the parallel mode is possible, the hybrid control unit may control a powertrain such that the vehicle is driven in the parallel mode, according to the request of the FATC.

When entry into the parallel mode is impossible, the hybrid control unit may determine whether a current situation corresponds to a short stop based on information acquired through the acceleration/deceleration predictor and the driving information detector (S640).

Upon determining that the current situation corresponds to the short stop, the hybrid control unit may disallow entry into the series mode. Disallowing of entry into the series mode may mean that the hybrid control unit changes the driving mode to an EV mode. Along with or separately from change to the EV mode, the hybrid control unit may change an engine operation request reference value of the FATC upon determining that that the current situation corresponds to the short stop.

Upon determining that the current situation does not correspond to the short stop, the hybrid control unit may control the powertrain in the series mode (S660). When the vehicle enters the EV mode upon stopping for a long period of time, the temperature of coolant does not increase for the long period of time due to engine off and thus heating is excessively delayed.

Figure 7:
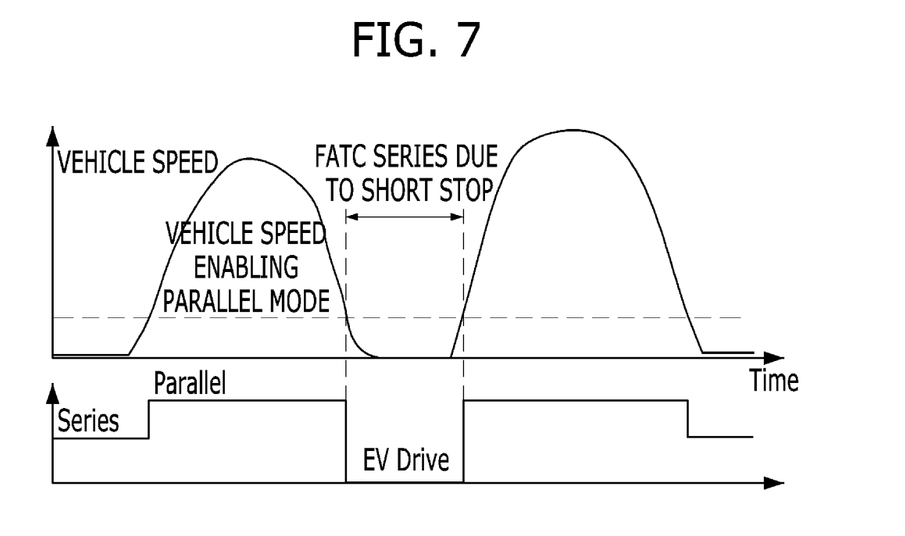
FIG. 7 is a view illustrating the effects of a mode change method according to an embodiment of the present disclosure as compared to FIG. 2.

FIG. 7 is a view illustrating the effects of a mode change method according to an embodiment of the present disclosure as compared to FIG. 2.

Referring to FIG. 7, the vehicle entering the parallel mode in a first acceleration period is equal to that of FIG. 2, but the mode is changed to the EV mode instead of the series mode in a short stop period, thereby suppressing entry into the series mode having low efficiency.

The above embodiments have been described as being configured such that a driver acceleration/deceleration intention prediction model is constructed and modified using a machine-learning method, through which a driver's intention in the future depending on the current traveling conditions is learned based on data accumulated by a vehicle during the actual operation of the vehicle. However, the configuration may alternatively be made such that a near-future acceleration/deceleration intention predictive value is determined using a predetermined rule, instead of using the aforementioned prediction model. One example of such a rule is shown in the following Table 1.

TABLE 1

| Input signal | Analysis of driving situation | Expected result |
|---|---|---|
| [Navi/Telematics]<br>Road type = Highway<br>Congestion information = Smooth<br>Front event = none<br>[Radar]<br>Front vehicle distance = Close<br>Front vehicle relative velocity = −10 kph<br>[Driving style/history]<br>Constant speed driving for the past 5 minutes<br>[Lane departure prevention system]<br>Maintain the current lane | Constant speed driving<br>Intermittent braking for maintaining the distance from the preceding vehicle | APS = 0,<br>BPS = Small |
| [Navi/Telematics]<br>Road type = Highway<br>Congestion information = Smooth<br>Front event = Tollgate/200 m<br>[Radar]<br>Front vehicle distance = none<br>Front vehicle relative speed = N/A<br>[Driving style/history]<br>Past toll pass average vehicle speed = 50 kph<br>[Lane departure prevention system]<br>Maintain the current lane | Highway driving<br>To go through the tollgate, decrease current speed to 50 kph | APS = 0,<br>BPS = Middle |

Although the above embodiments have been described as predicting the future required torque through near-future prediction, it will be apparent to those skilled in the art that the future required torque may be replaced by other types of parameters or information, e.g., a future acceleration predictive value that is predicted by the acceleration/deceleration prediction unit.

The hybrid vehicle according to at least one embodiment of the present disclosure can more efficiently perform heating in cold weather.

In particular, since the driving mode is determined by predicting stop properties using the machine-learning method, it is possible to prevent the driving mode from entering an inefficient series mode when heating is needed.

The above-described present disclosure may be implemented by computer-readable code in a computer-readable recording medium. The computer-readable recording medium includes all kinds of recording devices in which data readable by a computer system can be stored. Examples of the computer-readable recording medium include a hard disk drive (HDD), a solid state drive (SSD), a silicon disk drive (SDD), a ROM, a RAM, a CD-ROM, a magnetic tape, a floppy disk, an optical data storage device, and so on.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of controlling a mode change of a hybrid vehicle, the method comprising:
   receiving, by a hybrid control unit, an engine operation request from a full automatic temperature control (FATC) unit;
   determining, by the hybrid control unit, whether to enter a first hybrid electric vehicle (HEV) mode transferring engine power to wheels;
   determining, by the hybrid control unit, whether a predicted stop time is equal to or less than a predetermined time, when entry into the first HEV mode is impossible; and
   disallowing entry, by the hybrid control unit, into a second HEV mode transferring engine power to a motor for generation of electricity, when the predicted stop time is equal to or less than the predetermined time.

2. The method according to claim 1, further comprising entering the first HEV mode when entry into the first HEV mode is possible.

3. The method according to claim 1, further comprising entering the second HEV mode, upon determining that the predicted stop time exceeds the predetermined time.

4. The method according to claim 1, wherein the disallowing comprises entering an EV mode.

5. The method according to claim 1, wherein the determining of whether the predicted stop time is equal to or less than the predetermined time comprises determining that the predicted stop time is equal to or less than the predetermined time, when current movement of the vehicle corresponds to a stop and an acceleration predictive value or a required torque predictive value is equal to or greater than a predetermined value within the predetermined time.

6. The method according to claim 5, wherein the determining of whether the predicted stop time is equal to or less than the predetermined time further comprises:
   determining a predictive value of a driver's intention to accelerate/decelerate using an acceleration/deceleration prediction model having at least one of driver tendency information, advanced driver assistance system (ADAS) information, navigation information, or vehicle speed information as input values; and
   determining the acceleration predictive value or the required torque predictive value using the predictive value of the driver's intention to accelerate/decelerate.

7. The method according to claim 6, wherein the acceleration/deceleration prediction model is continuously modified through machine learning.

8. The method according to claim 6, wherein the predictive value of the driver's intention to accelerate/decelerate comprises position information of an accelerator pedal and a brake pedal in the near future.

9. The method according to claim 1,
   wherein the first HEV mode comprises a parallel mode, and
   wherein the second HEV mode comprises a series mode.

10. A computer-readable recording medium having recorded thereon a program for executing the method of controlling the mode change according to claim 1.

11. A hybrid vehicle, comprising:
    a full automatic temperature control (FATC) unit for controlling a temperature control function; and
    a hybrid control unit for performing control to receive an engine operation request from the FATC, to determine whether to enter a first hybrid electric vehicle (HEV) mode transferring engine power to wheels, to determine whether a predicted stop time is equal to or less than a predetermined time, when entry into the first HEV mode is impossible, and to disallow entry into a second HEV mode transferring engine power to a motor for generation of electricity, when the predicted stop time is equal to or less than the predetermined time.

12. The hybrid vehicle according to claim 11, wherein the hybrid control unit performs control to enter the first HEV mode when entry into the first HEV mode is possible.

13. The hybrid vehicle according to claim 11, wherein the hybrid control unit performs control to enter the second HEV mode, upon determining that the predicted stop time exceeds the predetermined time.

14. The hybrid vehicle according to claim 11, wherein the hybrid control unit performs control to enter an EV mode, when the predicted stop time is equal to or less than the predetermined time.

15. The hybrid vehicle according to claim 11, wherein the hybrid control unit determines that the predicted stop time is equal to or less than the predetermined time, when current movement of a vehicle corresponds to a stop and a predicted acceleration value or a required torque predictive value is equal to or greater than a predetermined value within the predetermined time.

16. The hybrid vehicle according to claim 15, further comprising:
    a driving information detector for detecting at least one of driver tendency information, advanced driver assistance system (ADAS) information, navigation information, or vehicle speed information; and
    a driving acceleration/deceleration predictor for generating a predictive value of a driver's intention to accelerate/decelerate in the near future, which reflects traveling conditions of the vehicle, using information received from the driving information detector utilizing an acceleration/deceleration prediction model,
    wherein the hybrid control unit determines the acceleration predictive value or the required torque predictive value using the predictive value of the driver's intention to accelerate/decelerate.

17. The hybrid vehicle according to claim 16, wherein the acceleration/deceleration prediction model is continuously modified through machine learning.

18. The hybrid vehicle according to claim 16, wherein the predictive value of the driver's intention to accelerate/decelerate comprises position information of an accelerator pedal and a brake pedal in the near future.

19. The hybrid vehicle according to claim 11,
    wherein the first HEV mode comprises a parallel mode, and
    wherein the second HEV mode comprises a series mode.

20. A non-transitory computer readable medium containing program instructions executed by a processor, the computer readable medium comprising:

program instructions that receive an engine operation request from a full automatic temperature control (FATC) unit;
program instructions that determine whether to enter a first hybrid electric vehicle (HEV) mode transferring engine power to wheels;
program instructions that determine whether a predicted stop time is equal to or less than a predetermined time, when entry into the first HEV mode is impossible; and
program instructions that disallow entry into a second HEV mode transferring engine power to a motor for generation of electricity, when the predicted stop time is equal to or less than the predetermined time.

\* \* \* \* \*